(12) United States Patent
Kang et al.

(10) Patent No.: US 12,457,524 B2
(45) Date of Patent: Oct. 28, 2025

(54) APPARATUS AND METHOD FOR PROVIDING N6-LAN USING SERVICE FUNCTION CHAINING IN WIRELESS COMMUNICATION SYSTEM

(71) Applicant: ELECTRONICS AND TELECOMMUNICATIONS RESEARCH INSTITUTE, Daejeon (KR)

(72) Inventors: Yoo Hwa Kang, Daejeon (KR); Changki Kim, Daejeon (KR); Jaewook Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 201 days.

(21) Appl. No.: 18/127,781

(22) Filed: Mar. 29, 2023

(65) Prior Publication Data

US 2023/0319635 A1  Oct. 5, 2023

(30) Foreign Application Priority Data

Mar. 29, 2022 (KR) .................. 10-2022-0039231
May 6, 2022  (KR) .................. 10-2022-0056279
(Continued)

(51) Int. Cl.
*H04W 28/08* (2023.01)
*H04L 12/14* (2006.01)
*H04L 12/46* (2006.01)

(52) U.S. Cl.
CPC ..... *H04W 28/0925* (2020.05); *H04L 12/1407* (2013.01); *H04L 12/4633* (2013.01); *H04L 12/4641* (2013.01)

(58) Field of Classification Search
None
See application file for complete search history.

(56) References Cited

U.S. PATENT DOCUMENTS 11,071,015 B2      7/2021  Jun et al.
2017/0012865 A1 *  1/2017  Nainar ............... H04L 45/38
(Continued)

FOREIGN PATENT DOCUMENTS

WO   WO-2022022345 A1 *  2/2022

OTHER PUBLICATIONS

3GPP, "3rd Generation Partnership Project; Technical Specification Group Services and System Aspects; Study on system enabler for service function chaining (Release 18)", 3GPP TR 23.700-18 V0.1.0 (Feb. 2022).

*Primary Examiner* — Christine T Duong
(74) *Attorney, Agent, or Firm* — LRK PATENT LAW FIRM

(57) ABSTRACT

Proposed is a wireless communication system and, more particularly, an apparatus and method for providing a N6-LAN service using SFC in a wireless communication system. A method of supporting an N6-LAN traffic steering function using an SFC technology in a wireless communication system, includes a process in which a policy control function (PCF) configures additional information for N6-LAN traffic steering on the basis of a policy and charging control (PCC) rule, a process of transmitting the configured additional information to a session management function (SMF), a process in which the SMF configures a forwarding action rule (FAR) including the additional information for N6-LAN traffic steering a process in which the SMF transmits the FAR including the additional information to a user plane function (UPF), and a process in which the
(Continued)

UPF performs SFC encapsulation on the basis of a predefined SFC policy and the FAR.

15 Claims, 9 Drawing Sheets

(30) Foreign Application Priority Data

Aug. 8, 2022 (KR) .......................... 10-2022-0098792
Mar. 14, 2023 (KR) .......................... 10-2023-0033365

(56) References Cited

U.S. PATENT DOCUMENTS

| | | |
|---|---|---|
| 2019/0007500 A1 | 1/2019 | Kim et al. |
| 2023/0058366 A1* | 2/2023 | Perez Martinez .... H04W 24/10 |
| 2024/0214282 A1* | 6/2024 | Ding .................. H04L 41/5054 |

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Service Path Identifier (SPI)       | Service Index  |
+-+-+-+-+-+-+-+-+-+-+-+-+-+-+-+-+-+-+-+-+-+-+-+-+-+-+-+-+-+-+-+-+
```

Fig.6

| Information name | Description | Category |
|---|---|---|
| Rule identifier | Uniquely identifies the PCC rule, within a PDU Session. It is used between PCF and SMF for referencing PCC rules. | Mandatory |
| N6-LAN Traffic Steering Enforcement Control | This part describes information required for N6-LAN Traffic Steering. | |
| Traffic steering policy identifier(s) | Reference to a pre-configured traffic steering policy at the SMF. | |
| SFC/SFP ID(s) | Describes SFC/SFP Identification and optionally metadata for the SFC encapsulation. | |
| AF influenced Traffic Steering Enforcement Control | This part describes information required for AF influenced Traffic Steering. | |
| Data Network Access Identifier | Identifier(s) of the target Data Network Access (DNAI). | |
| Per DNAI: Traffic steering policy identifier(s) | Reference to a pre-configured traffic steering policy at the SMF. | |
| Per DNAI: N6 traffic routing information | Describes the information necessary for traffic steering to the DNAI. | |
| Per DNAI: SFC/SFP ID(s) | Describes SFC/SFP Identification and optionally metadata for the SFC encapsulation. | |

Fig. 7

| Information Name | Applicable for PCF or NEF | Category |
|---|---|---|
| Traffic Description | Defines the target traffic to be influenced, represented by the combination of DNN and optionally S-NSSAI, and application identifier or traffic filtering information. | Mandatory |
| Target UE Identifier(s) | Indicates the UE(s) that the request is targeting, i.e. an individual UE, a group of UE represented by Internal Group Identifier (NOTE 3), or any UE accessing the combination of DNN, S-NSSAI and DNAI(s). | Mandatory |
| AF transaction identifier | The AF transaction identifier refers to the AF request. | Mandatory |
| N6 Traffic Routing requirements | Routing profile ID and/or N6 traffic routing information corresponding to each DNAI and an optional indication traffic correlation. The addition of 'Traffic Direction' is optional (uplink or downlink). | Optional |
| SFC/SFP ID | Indicates SFC/SFP ID and optionally metadata for the SFC encapsulation. | Optional |

Fig. 8

| Attribute | Description | Comment |
|---|---|---|
| N4 Session ID | Identifies the N4 session associated to this FAR. | |
| Rule ID | Unique identifier to identify this information. | |
| Forwarding policy | Reference to a preconfigured traffic steering policy or http redirection. | Contains one of the following policies identified by a TSP ID: <br> - an N6-LAN steering policy to steer the subscriber's traffic to the appropriate N6 service functions deployed by the operator, or <br> - a local N6 steering policy to enable traffic steering in the local access to the DN according to the routing information provided by an AF as described in clause 5.6.7, or <br> - a Redirect Destination and values for the forwarding behaviour (always, after measurement report (for termination action "redirect")). |
| SFC/SFP ID | Indicates SFC/SFP Identification and optionally metadata for the SFC encapsulation. | |

APPARATUS AND METHOD FOR PROVIDING N6-LAN USING SERVICE FUNCTION CHAINING IN WIRELESS COMMUNICATION SYSTEM

CROSS REFERENCE TO RELATED APPLICATIONS

The present application claims priority to Korean Patent Application No. KR 10-2022-0039231, filed Mar. 29, 2022 and Korean Patent Application No. KR 10-2022-0056279, filed May 6, 2022 and Korean Patent Application No. KR 10-2022-0098792, filed Aug. 8, 2022 and Korean Patent Application No. KR 10-2023-0033365, filed Mar. 14, 2023, the entire contents of which are incorporated herein for all purposes by this reference.

BACKGROUND OF THE INVENTION

1. Field of the Invention

The disclosure relates to a wireless communication system and, more particularly, an apparatus and method for providing a N6-LAN using SFC in a wireless communication system.

2. Description of Related Art

In a 5G communication system, an N6-LAN service is a kind of interface that is used instead of Gi/SGi-LAN that is usually used for LTE, and a mobile communication provider can provide various additional services using the N6-LAN service.

A service Function Chaining (SFC) technology is one of methods enabling a mobile communication provider to provide various additional services using a service function chain. Functions such as DPI, NAT, a firewall, policy control, traffic/content optimization, etc. are performed through the SFC technology and packets can be processed in a service function chain through the SFC technology.

SFC may be performed in the way of extracting a portion of a packet, determining what Service Function (SF) the packet will undergo on the basis of the extracted portion, and then selecting a next SF When service functions are connected in a chain using SFC, it is possible to simplify a packet processing process in a network and provide various additional services.

Accordingly, a mobile communication provider can provide customers with more various and effective services.

SUMMARY OF THE INVENTION

The disclosure provides an apparatus and method for providing an L6-LAN service using SFC in a wireless communication system.

Further, the disclosure provides an apparatus and method for managing information for SFC encapsulation in a wireless communication system.

Further, the disclosure provides an apparatus and method for packet processing for SFC encapsulation in a wireless communication system.

Further, the disclosure provides an apparatus and method for providing an N6-LAN service using an SFC technology in a wireless communication system.

Further, the disclosure provides an apparatus and method for directly controlling an N6-LAN service for a specific application traffic in accordance with a request from a service provider using an SFC technology in a wireless communication system.

According to various embodiments of the disclosure, a method of supporting an N6-LAN traffic steering function using an SFC technology in a wireless communication system, includes: a process in which a policy control function (PCF) configures additional information for N6-LAN traffic steering on the basis of a policy and charging control (PCC) rule; a process of transmitting the configured additional information to a session management function (SMF); a process in which the SMF configures a forwarding action rule (FAR) including the additional information for N6-LAN traffic steering; a process in which the SMF transmits the FAR including the additional information to a user plane function (UPF); and a process in which the UPF performs SFC encapsulation on the basis of a predefined SFC policy and the FAR.

According to various embodiments of the disclosure, an apparatus for supporting an N6-LAN traffic steering function using an SFC technology in a wireless communication system, includes: a policy control function (PCF), a session management function (SMF), and a user plane function (UPF), in which the PCF configures additional information for N6-LAN traffic steering on the basis of a policy and charging control (PCC) rule and transmits the configured additional information to the session management function (SMF); the SMF configures a forwarding action rule (FAR) including the additional information for N6-LAN traffic steering; the SMF transmits the FAR including the additional information to a user plane function (UPF); and the UPF performs SFC encapsulation on the basis of a predefined SFC policy and the FAR.

According to various embodiments of the disclosure, a method of operating a user plane function (USF) in a wireless communication system includes: a process of receiving additional information for N6-LAN traffic steering from a policy control function (PCF) through a session management function (SMF) on the basis of a policy and charging control (PCC) rule; and a process of performing SFC encapsulation on the basis of a predefined service function chaining (SFC) policy and a forwarding action rule (FAR).

An apparatus including a user plane function (UPF) in a wireless communication system include: a transceiver; and a controller operably connected to the transceiver, in which the controller receives additional information for N6-LAN traffic steering from a policy control function (PCF) through a session management function (SMF) on the basis of a policy and charging control (PCC) rule, and performs SFC encapsulation on the basis of a predefined service function chaining (SFC) policy and a forwarding action rule (FAR).

The apparatus and method according to various embodiments of the disclosure provides an N6-LAN service using an SFC technology, whereby it is possible to directly control the N6-LAN service for specific application traffic in accordance with requests from not only mobile communication providers, but also service providers.

The effects of the disclosure are not limited to the effects described above and other effects can be clearly understood by those skilled in the art from the following description.

BRIEF DESCRIPTION OF THE DRAWINGS

The above and other objectives, features and other advantages of the present invention will be more clearly understood from the following detailed description when taken in conjunction with the accompanying drawings, in which:

FIG. 6 shows an example of a PCC rule additionally defining traffic steering information required to provide an SFC service in a wireless communication system according to an embodiment of the disclosure;

FIG. 7 shows an example of information that is requested by an AF for an SFC service using a method of requesting AF influenced traffic routing in accordance with an embodiment of the disclosure;

FIG. 8 shows an example of traffic steering relevant information in a FAR that is transmitted to a UPF by an SMF in accordance with an embodiment of the disclosure;

DETAILED DESCRIPTION OF THE INVENTION

Terminologies used in the disclosure may be used only to describe specific embodiments without intention of limiting the range of other embodiments. Singular forms are intended to include plural forms unless the context clearly indicates otherwise. All terminologies used herein including technological or scientific terminologies may have the same meanings that are generally understood by those skilled in the art. Terminologies defined in general dictionaries of the terminologies used herein may be understood as having meanings the same as or similar to the meanings in the contexts and should not be construed as abnormally or exclusively formally meanings unless specifically defined herein. Depending on cases, even if terminologies defined herein, they should not be construed as excluding the embodiments of the disclosure.

Various embodiments of the disclosure to be described hereafter are described through examples of hardware approaches. However, since various embodiments of the disclosure include a technology that uses both hardware and software, various embodiments of the disclosure do not exclude approaches based of software.

Hereafter, the disclosure relates to an apparatus and method for providing an N6-LAN service using SFC in a wireless communication system. In detail, the disclosure describes a technology for managing information for performing SFC encapsulation in a wireless communication system, a technology for packet processing for SFC encapsulation, a technology for providing an N6-LAN service using an SFC technology, and a technology for directly controlling an N6-LAN service for a specific application traffic in accordance with a request from a service provider using the SFC technology.

In the following description, terms indicating signals, terms indicating channels, terms indicating control information, terms indicating network entities, terms indicating components of an apparatus, etc. are exemplified for the convenience of description. Accordingly, the disclosure is not limited to the terms to be described hereafter and other terms having equivalent meanings may be used.

Further, various embodiments are described herein using the terms, which are used in some communication standards (e.g., 3rd generation partnership project (3GPP)), but they are only examples for description. Various embodiments of the disclosure may be easily modified to be applied to other communication systems.

Figure 1:
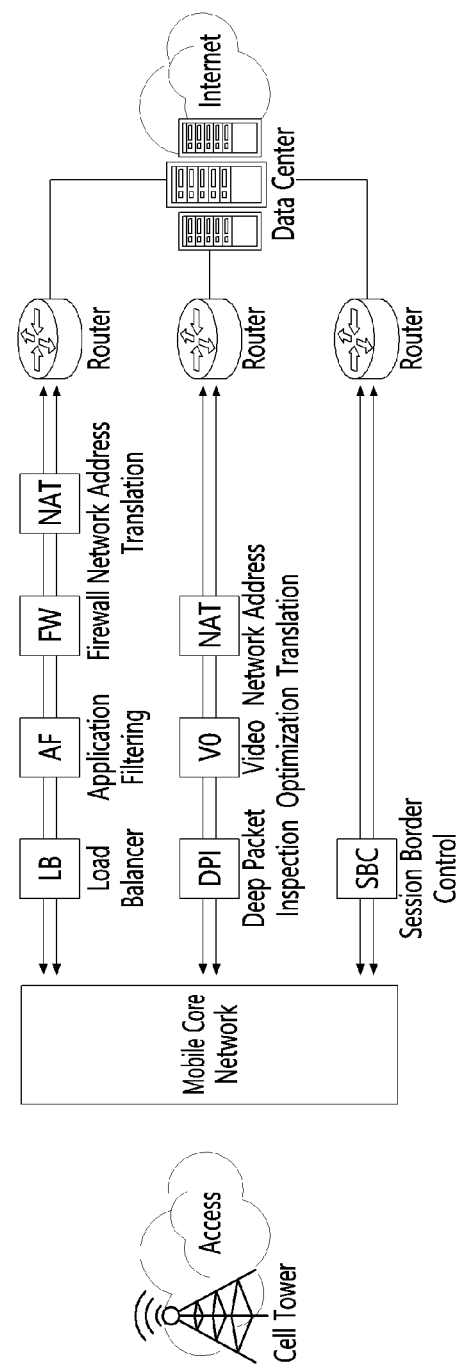
FIG. 1 shows an example of an S/Gi-LAN service function according to various embodiments of the disclosure.

FIG. 1 shows an example of an S/Gi-LAN service function according to various embodiments of the disclosure.

Referring to FIG. 1, a 4G-based mobile core network may be composed of an evolved packet core (EPC) and Gi/SGi-LAN. Gi-LAN is a network on which a mobile communication provider provides various additional services using combinations of IP-based service functions such as a Load Balancer (LB), an application filter (AF), a Firewall, Carrier-grade network address translation (NAT), deep packet inspection (DPI), Video Optimization (VO), Session Border Control (SBC), policy control, traffic/content optimization, etc.

In detail, an LB is equipment that provides a function that enables a service to be stably and quickly provided by distributing server loads. An AF is equipment that provides a function of filtering or monitoring data of applications on a network. A firewall is equipment that provides a function of protecting a network and a system from illegal external approaches and attacks. Carrier-grade NAT is equipment that provides a function of allocating and managing addresses using NAT to solve the problem of lack of IPv4 addresses. DPI is equipment that provides a function of identifying specific protocol, service, application, etc. by analyzing data in a packet. VO is equipment that provides a function of enabling a network bandwidth to be efficiently used by optimizing the quality and bandwidth of video data. SBC is equipment that performs a function of providing a call processing function by controlling the borders between sessions on an IP communication network.

Referring to FIG. 1, a mobile core network has a Gi-LAN interface to be connected to the internet and the Gi-LAN interface may be an interface that substantially connects a packet gateway (P-GW) in the mobile core network to a packet data network (PDN). Service functions of such Gi-LAN may be connected to a data center through a router and the data center may be connected to the internet.

According to an embodiment, a packet gateway (P-GW) is a technology that is used on a mobile communication network, and relays packet between mobile user equipment and an IP network. Accordingly, the P-GW plays an important role in LTE and a 5G network. The P-GW enables data transmission between user equipment and an external IP network on a mobile communication network, so it is possible to receive an IP packet, examine user information in the packet and a data traffic, and classify corresponding information. Thereafter, it is possible to relay the packet to appropriate object on the basis of the information.

According to an embodiment, a router, which is a kind of network equipment, can serve to relay packets by connecting two or more computers. The router can serve to transmit packets to destinations using IP address information of the packets. Accordingly, the router can transmit data between several logically separated networks and all of devices connected to the internet can perform communication through the router.

According to an embodiment, a packet data network (PDN), which is a network that provides IP-based data communication, may include various networks such as the internet, an enterprise network, a service provider's own network, etc. A mobile user can use various services such as the internet by connecting to the PDN through a mobile communication network. The PDN enables the mobile user to connect to the internet and to transmit data by operating with the mobile communication network. To this end, the mobile communication network is connected to the PDN using equipment such as a Packet Gateway (P-GW) and can relay data that are transmitted by a user.

According to an embodiment, the router can determine what paths packets should be transmitted through, using a routing algorithm that determines paths of packets. Accordingly, the router can transmit packets to destinations of the packets through optimum paths and can play an important role in various network environments including the internet.

According to an embodiment, S/Gi-LAN corresponds to N6-LAN in 5G and mobile communication providers can provide various additional services using various kinds of service functions through N6-LAN as in S/Gi-LAN. A standard study has been started 3GPP Rel-18 to perform N6-LAN traffic control using an IETF service function chain (SFC) technology.

Figure 2:
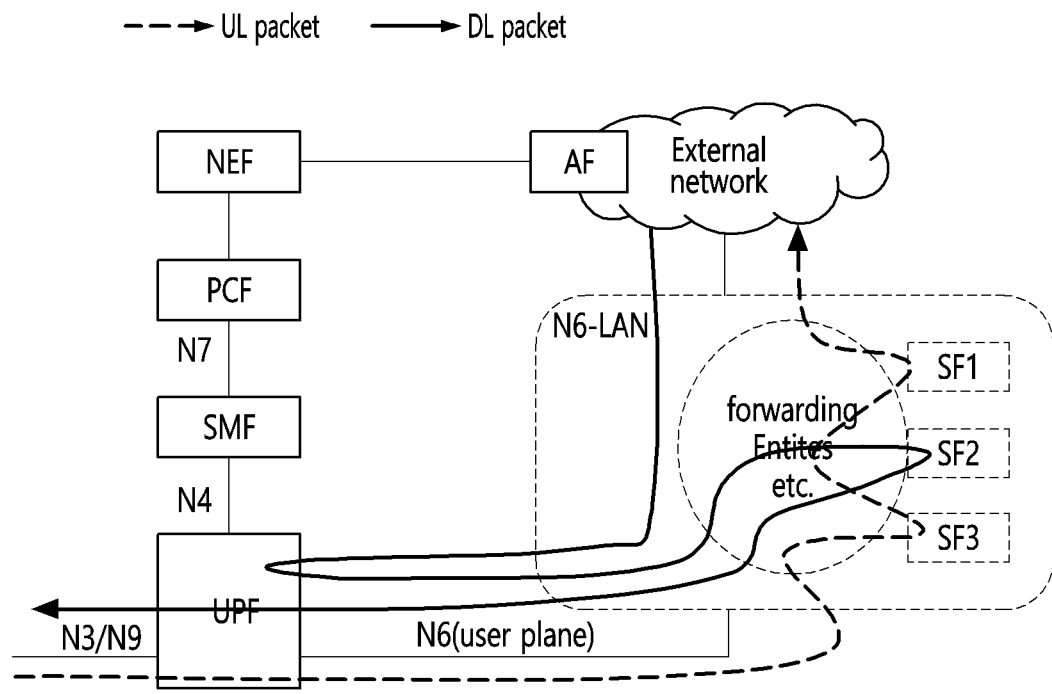
FIG. 2 shows an example of configuring N6-LAN according to various embodiments of the disclosure.

FIG. 2 shows an example of configuring N6-LAN according to various embodiments of the disclosure.

Figure 3:
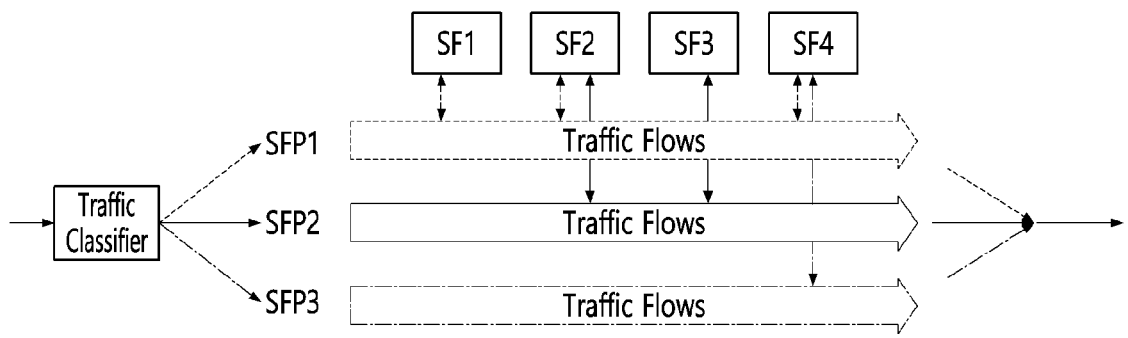
FIG. 3 is a conceptual diagram of SFC according to various embodiments of the disclosure.

Referring to FIG. 2, a 3GPP TR 23.700-18 (Study on system enabler for service function chaining, Rel-18) standard study document may observe IETF RFC 7665, Service Function Chaining (SFC) Architecture, and it may be assumed that a 5G system (5GS) operates as a traffic classifier shown in FIG. 3. In more detail, a user plane function (UPF) in a 5G system may operate as a classifier for the traffic that is transmitted to N6-LAN. A traffic classifier may mean equipment or software that serves to identify and classify specific traffic by analyzing packet data on a network.

According to an embodiment, a traffic classifier can find out the source, the destination, the protocol, the port number, etc. of packets by analyzing header information of the packets. It is possible to control or filter traffic by identifying a specific application, service, user, group, etc. and applying relevant policies or rules on the basis of the items.

According to an embodiment, the traffic classifier plays an important role on a large-scale network and can result in effects such as security of Quality of Service (QoS), security enforcement, traffic optimization, cost reduction, etc. For example, in an enterprise, it is possible to increase the priority of important work data and apply security policies such as website access restriction using a traffic classifier. Further, also in a mobile communication network, it is possible to control the transmission amount of data for each service and user and manage traffic to secure QoS using a traffic classifier.

Accordingly, traffic classified by the traffic classifier of FIG. 3 is processed into a combination of service functions through respective SFPs and then transmitted to a final data network (DN). Since, as described above, traffic is classified and processed through SFPs using an SFC technology to provide an N6-LAN service, a mobile communication provider can configure N6-LAN for providing various additional services using SFC.

A service function path (SFP) may mean a path of service functions that are sequentially applied to process a specific traffic. An SFP may be used to determine what path a specific traffic will flow through and what service function the specific traffic will undergo. A series of service function IDs, lengths, and orders may be included in an SFP Each service function ID means a unique identifier of a service that is used in SFC, and the length may represent the length of data that a corresponding service function processes. The order may represent the order of a corresponding service function that is processed in an SFP. Service functions in an SFP each have a Service Index (SI), and service functions may be sequentially processed while an SI value decreases in decrement of 1 every time a packet is moved through a service path.

A network entity function (NEF) of FIG. 2 is a function of performing a function of exposing network resources by connecting to an external system on a 5G network. A policy control function (PCF) is a function of managing policies on a 5G network, that is, a function of applying and managing various policies related to service requests. A session management function (SMF), which is a function of performing session management on a 5G network, may be in charge of session management and control with user equipment (UE). A user plane function (UPF), which is a function that is in charge of data packet transmission on a 5G network, may perform IP address translation and traffic management for packet data transmission. An AF, which is a function of processing and managing data related to applications on a 5G network, may perform network resource allocation, QoS management, etc.

FIG. 3 is a conceptual diagram of SFC according to various embodiments of the disclosure.

Referring to FIG. 3, SFPs are determined by a traffic classifier, whereby paths can be classified. The SFPs may undergo different SFs.

For example, SFP1, SFP2, and SFP3 may be classified by a traffic classifier.

The SFP1 may undergo service functions of SF1, SF2, and SF4. The SFP2 may undergo service functions of SF2 and SF3. The SFP3 may undergo only a service function of SF4.

A traffic classifier should perform SFC encapsulation so that packets are transmitted through SFPs.

Figures 4, 5:
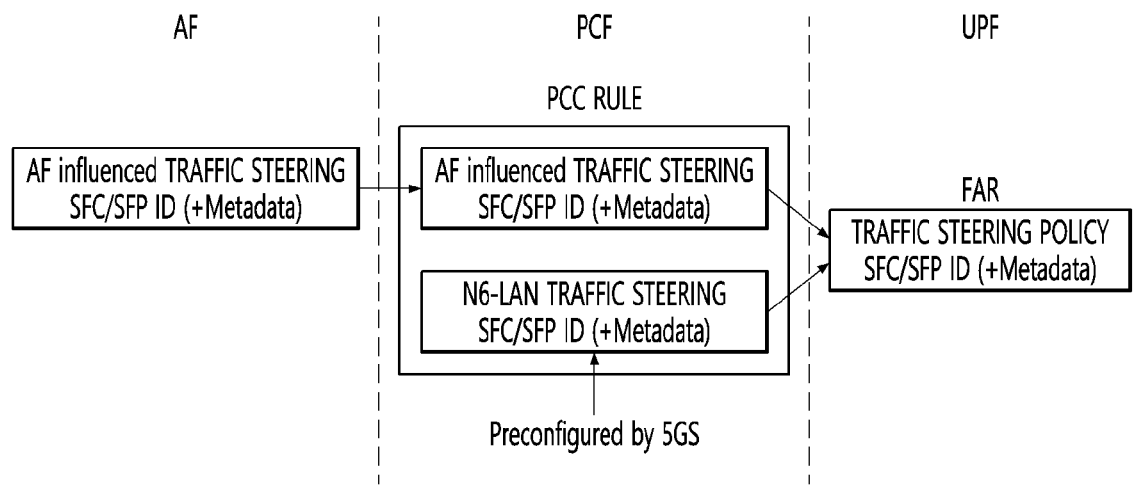
FIG. 4 shows an example of a packet format for performing SFC encapsulation according to various embodiments of the disclosure.
FIG. 5 shows an example of a method of managing traffic steering policy information in a 5GS in accordance with an embodiment of the disclosure.

FIG. 4 shows an example of a packet format for performing SFC encapsulation according to various embodiments of the disclosure.

Referring to FIG. 4, FIG. 4 shows a packet format for performing SFC encapsulation as an example of using a network service header defined in IETF RFC 8300. In order for a 5GS to perform SFC encapsulation, as shown in FIG. 4, a service path identifier (SPI) is added into a packet, whereby a SFP identifier (ID) is put as an SPI value and an SFP length is put into a Service Index (SI) value. While a packet is transmitted through an SFP, service functions in the SFP can decrease an SI value in decrement of 1

According to an embodiment, the SPI may be an identifier that identifies service path. The SPI is included in an SFC packet header and can transmit information about a service path when a packet is transmitted from an SFC domain. The SPI may be used to identify a service path in SFC. SFC defines service paths and may be composed of several service functions that process packets in accordance with respective service paths. The SPI identifies the service functions and may be used to define the order of processing packets in the service paths.

According to an embodiment, an SPI value is used to identify a service path and has a unique value for each service path. Since SPI values are different in service paths, it is possible to appropriately process packets in accordance with service paths in SFC.

An SI may be a value representing the location at which a packet is processed on a service path. An SI may be included in an SFC packet header and may represent a corresponding location when a packet is transmitted through a service path.

An SI is used to process a packet through a service path in SFC. An SI value represents the location at which a packet is processed on a service path and SI values may be different from each other in service paths. An SI value is initially set as the length of a service path and decreases in decrement of 1 every time a packet is processed through the service path. Accordingly, an SI value represents the location at which a packet is processed through a service path and may become 0 in the last service function.

A standard study was started in 3GPP Rel-18 to provide an N6-LAN service using the SFC technology, but a detailed method about packet processing for SFC encapsulation has not been proposed yet. Accordingly, the disclosure proposes a method that manages information for performing SFC encapsulation in a 5GS and in which a UPF processes packets for SFC encapsulation.

Hereafter, the disclosure proposes a method in which a 5GS manages SFC information and a UPF performs SFC encapsulation. To this end, a method of managing information for SFP encapsulation and a relevant procedure are disclosed.

Through the disclosure, a 5GS provides an N6-LAN service using an SFC technology, whereby it is possible to directly control the N6-LAN service for specific application traffic in accordance with requests from not only a mobile communication provider, but also a service provider.

Hereafter, in order to provide an N6-LAN service using an SFC technology, the disclosure discloses first a method of managing a policy for performing traffic steering for an N6-LAN interface, and a method and apparatus for performing SFC encapsulation through a UPF on the basis of the traffic steering policy.

FIG. 5 shows an example of a method of managing traffic steering policy information in a 5GS in accordance with an embodiment of the disclosure.

Referring to FIG. 5, traffic steering information may be input in two cases of when an AF requests the traffic steering information in accordance with input by an external provider and when there is preconfiguration in a 5GS.

A policy and charging control rules may be classified, stored, and managed as AF influenced traffic steering and N6-LAN traffic steering information in accordance with each input.

The Policy and Charging Control (PCC) rule is a rule for applying QoS and a charge policy on a mobile communication network. The PCC rule is created at a Policy and Charging Rules Function (PCRF), whereby it is possible to define and apply QoS and a charge policy for specific services on a network. The PCC rule is created in consideration of various factors such as a service type, a user group, a location, time, etc. For example, it is possible to set a maximum transmission speed, a bandwidth limit, a priority, etc. for a specific service. Further, it is also possible to set a charge policy in consideration of the level, use amount, subscription period, etc. of a service user. The PCC rule is created at the PCRF and is applied at a Policy and Charging Enforcement Function (PCEF). Accordingly, the PCEF applies and manages QoS and a charge policy for specific services on a network. By applying the PCC rule, a network can provide better QoS and charge policy.

Traffic steering information may be necessary information for a 5GS to perform N6-LAN traffic steering in all cases regardless of the policy of a provider or requests from an external AF.

When an SFC service is requested from an AF in addition to setting due to an internal policy of a provider, it may mean that the AF asks a 5GS to apply an SFC policy requested for a corresponding application on the basis of a preset SFC ID or SFP ID and metadata.

In order to transmit such traffic steering information stored in a PCC rule to a UPF that is substantially in charge of packet processing, an SMF may store the traffic steering information in a forwarding action rule (FAR). As described above, even though two kinds of traffic steering information exit in a PCC rule, only one item of traffic steering information may be stored in an FAR for a UPF to perform packet forwarding.

The Forwarding Action Rule (FAR) is one of rules that are used on a 5G network defined in 3GPP The FAR is included in a Packet Forwarding Control Protocol (PFCP) message and is used in a User Plane Function (UPF), whereby it is used to process data packets. The FAR provides information about a packet processing operation that is performed in the UPF. The FAR includes parameters related to action information for packet processing. Such action information may be used to designate a way of allocating data packets to a specific service, and functions such as packet filtering, Network Address Translation (NAT), and Quality of Service (QoS) processing.

The FAR is used to designate data packet processing for a specific service. For example, the FAR sorts packet processing for services such as an internet service, a streaming service, and a game service. The FAR is transmitted by a PFCP message and the PFCP may be a protocol for communication between a Policy Control Function (PCF) and a UPF.

Further, the FAR is used to designate a packet processing operation in the UPF. Accordingly, it is possible to allocate data packets to an appropriate service, apply QoS processing, and perform various functions such as NAT, packet filtering, etc.

FIG. 6 shows an example of a PCC rule additionally defining traffic steering information required to provide an SFC service in a wireless communication system according to an embodiment of the disclosure.

Referring to FIG. 6, traffic steering information that is newly added may include an SFC/SFP ID and optionally metadata. The metadata are data describing information about data, that is, may be considered as data that describe data. Metadata may include information such as the contents, structure, format, property, creation date, etc. of data, and may be used to manage validity, accuracy, quality, security, etc. of data. Metadata may play an important role in management of data. It is possible to efficiently perform work such as data search, arrangement, classification, verification, etc. by effectively managing metadata.

Referring to FIG. 6, an SFC/SFP ID and metadata option information may be included in both of information for N6-LAN traffic steering information control and information for AF influenced traffic steering control.

Further, since the AF influenced traffic steering can control only a current uplink traffic, one or more traffic steering policy identifiers may be defined equally to the N6-LAN traffic steering so that a downlink traffic can also be included.

According to the PCC rule of FIG. 6, one or more items of traffic steering information may exist for one application, but, substantially, only one of the N6-LAN traffic steering information or the AF influenced traffic steering information may be applied. That is, even though the N6-LAN traffic steering information and the AF influenced traffic steering information both exist for the same application, information that is substantially used for SFC encapsulation may be one. That is, this may mean that two kinds of traffic steering have priorities. It is stated in current 3GPP standards that when two kinds of traffic steering exist, N6-LAN has a priority, but, according to an embodiment, priorities may be determined in accordance with provider policies. Accordingly, when N6-LAN traffic steering information and AF influenced traffic steering information both exist for the same application, they may be selected in accordance with priorities that are determined by a provider, and when there is no policy for priorities by a provider, the N6-LAN traffic steering information may be given a priority in accordance with current standards.

A method of formulating a policy of performing traffic steering for an N6-LAN interface defined in a PCC rule may be classified into (1) a method in which a mobile communication provider formulates an N6-LAN traffic steering policy in a 5GS and (2) a method of receiving input from an external service provider and formulating a traffic steering policy.

First, when a 5GS internally has a policy about an SFC service, it is possible to add and manage an SFC/SFP ID and optionally metadata in N6-LAN traffic steering information of PCC rule. The SFP ID and the metadata, as described above, may be information required for a UPF operating as a traffic classifier to perform SFC encapsulation on a packet. According to IETF RFC 7665, an SFP ID is necessarily required for SFC encapsulation and metadata may be optionally added.

Second when an SFC service is requested from an AF, it is possible to store an SFC/SFP ID and metadata received from the AF in a PCC rule. The AF may request a preset SFC ID or SFP ID from a 5GS. That is, it means that the AF asks the 5GS to apply an SFC policy requested for a corresponding application. In order to provide the SFC service requested by an application, a UPF substantially should perform packet processing for SFC encapsulation on a packet. The AF may request an SFC/SFP ID and additionally metadata from the 5GS so that the UPF can perform SFC encapsulation in an SFC traffic.

Referring to FIG. 6, the items represented as "Mandatory" in Category may be classified as necessary information and the items with blanks in Category may be mandatory or optional information.

Referring to FIG. 6, according to an embodiment, Rule Identifier, which is an identifier that can be uniquely identified in a PCC rule, can be used between a Policy Control Function (PCF) and a Session Management Function (SMF) to refer to a specific PCC rule in a PDU Session. The Rule Identifier can designate the priority, transmission speed, access priority, etc. of a data packet. The Rule identifier is used to refer to a PCC rule and may be used to transmit a PCC rule between the PCF and the SMF. That is, the Rule Identifier is one of important components for data traffic control and QoS management on a 5G network and can play a necessary role in management of a PCC rule.

According to an embodiment, N6-LAN Traffic Steering may be based on a Service Function Chaining (SFC) that is used on a 5G network. N6-LAN Traffic Steering Enforcement Control controls traffic through SFC and may include information required to perform traffic steering. The N6-LAN Traffic Steering Enforcement Control provides information necessary to control traffic on a 5G network using N6-LAN. Accordingly, a mobile communication provider can maintain QoS and provide customers with various additional services.

According to an embodiment, Traffic steering policy identifier(s), which is one of information used to control traffic steering on a 5G network, may be an identifier that refers to a preconfigured traffic steering policy in a Session Management Function (SMF). The information used to control traffic steering may be used to manage and control traffic of a specific Session Protocol Data Unit (PDU) with reference to a preconfigured traffic steering policy in the SMF. Accordingly, a mobile communication provider can efficiently use network resources and maintain QoS.

According to an embodiment, SFC/SFP ID(s) may be one of information required to control and manage traffic using Service Function Chaining (SFC) on a 5G network. The SFC/SFP ID(s) is the identifier of an SFC/SFP and a unique ID may be allocated to each SFC/SFP The SFC/SFP ID(s) may be used to control traffic through SFC and refer to a specific service function path. Further, according to another embodiment, the SFC/SFP ID(s) may include metadata for SFC encapsulation. The SFC/SFP ID(s) gives a unique ID to each SFC/SFP, whereby it is possible to accurately control and manage traffic. Further, the SFC/SFP ID(s) includes metadata for SFC encapsulation, whereby it is possible to efficiently control traffic on a network.

According to an embodiment, AF influenced Traffic Steering may mean performing traffic steering in accordance with a requirement that is generated at an AF. The AF is in charge of a function of performing applications on a 5G network, and performs traffic steering to satisfy specific service requirements in some cases. In the AF influenced Traffic Steering Enforcement Control, information about a traffic steering requirement that is generated at the AF may be provided. Accordingly, information about a requirement that is generated at the AF is processed in the SMF and traffic steering is performed, whereby a mobile communication provider can provide customers with stable and high-quality services.

According to an embodiment, Data Network Access Identifier (DNAI) may be an identifier that is used to identify data network access on a 5G network. The DNAI is an identifier for a specific data network and may be used to identify and manage access to the data network on a 5G network. The Data Network Access Identifier may include one or more identifiers and each of the identifiers may represent information about a corresponding data network. For example, the DNAI may include information such as an IP address, a VLAN ID, a service ID, etc. for a data network. The DNAI may be needed to efficiently manage access to a data network on a 5G network and to identify the destination of a PDU. Accordingly, the DNAI is one of important information on a 5G network and is necessary for securing stable access for a data network. According to an embodiment, Per DNAI: Traffic steering policy identifier(s) may be information that is used to designate a traffic steering policy for each Data Network Access Identifier (DNAI). The Per DNAI: Traffic steering policy identifier(s) may be used in the Session Management Function (SMF). The SMP can manage a traffic steering policy and apply each policy in accordance with the DNAI. To this end, it is required to refer to a traffic steering policy identifier for each DNAI. The SMF manages a policy for each DNAI and efficiently manages access to a data network, whereby a mobile communication provider can provide customers with stable and high-quality services.

According to an embodiment, Per DNAI: N6 traffic routing information, which is one of traffic steering information for the Data Network Access Identifier (DNAI), can provide information for designating traffic routing toward a DNAI. The Per DNAI: N6 traffic routing information may be used in the Session Management Function (SMF). A mobile communication provider can optimize access to a data network and can provide customers with stable and high-quality services by designating appropriate traffic routing for each DNAI.

According to an embodiment, Per DNAI: SFC/SFP ID(s), which is one of traffic steering information for each Data Network Access Identifier (DNAI), can provide Service Function Chain (SFC) and Service Function Path (SFP) identification information for each DNAI and optional metadata for SFC encapsulation. Per DNAI: SFC/SFP ID(s) information can be used to perform traffic steering and SFC encapsulation for a DNAI in the SMF and to efficiently manage traffic to a data network. A mobile communication provider can optimize access to a data network and can provide customers with stable and high-quality services by designating appropriate SFC/SFP identification and capsulation information.

FIG. 7 shows an example of information that is requested by an AF for an SFC service using a method of requesting AF influenced traffic routing in accordance with an embodiment of the disclosure.

In the disclosure, an AF can request a 5GS to apply an SFC policy of a corresponding application by adding an SFC/SFP ID for a SFC service and optionally metadata to existing AF influenced traffic routing request information requested by an AF. Information that is requested for an SFC service can be transmitted to a PCF and stored in a PCC rule using a method for an AF to request AF influenced traffic routing.

AF influenced traffic routing defined in the current 3GPP standards is set to be requested by an AF only for uplink packet routing. However, uplink and downlink traffic both should be able to be applied for an SFC service. Accordingly, when an SFC service is requested using AF influenced traffic routing under the current standards, information that represents a traffic direction may be additionally required.

Referring to FIG. 7, in the disclosure, it is possible to add traffic direction parameters representing an uplink and a downlink for an SFC service to AF influenced traffic routing information that is requested by an AF. According to the disclosure, an AF can request SFC service information for performing N6-LAN for the traffic in both directions of an uplink and a downlink.

Referring to FIG. 7, according to an embodiment, Traffic Description can be used to define a target traffic to be influenced, and may be represented by a combination of a DNN and optionally an S-NSSAI, an application identifier, or traffic filtering information. The Traffic Description can be used to select traffic to be applied to a PCC rule by a PCF. The DNN is a data network name and the S-NSSAI may be used as a service designator. The application identifier is used to represent an application and the traffic filtering information can be used to filter traffic on the basis of a field value of a packet header. The Traffic Description may be classified as Mandatory information.

According to an embodiment, Target UE Identifier may represent UE that is the target of a specific request. The Target UE Identifier may represent individual UE, several UE groups represented by internal group identifiers, or all UE connecting to combinations of specific DNN, -NSSAI, and DNAI(s). The Target UE Identifier can be used to identify specific UE to which traffic steering or a QoS policy is applied. The Target UE Identifier may be classified as Mandatory information.

According to an embodiment, AF transaction identifier may be an ID for identifying an AF request. The AF transaction identifier may be classified as Mandatory information.

According to an embodiment, N6 Traffic Routing requirements relates to optional representation of a routing profile corresponding to each DNAI, N6 traffic routing information corresponding to each DNAI, and a traffic correlation. Traffic Direction may be optionally added and, according to an embodiment, it may represent an uplink or a downlink. N6 Traffic Routing requirements may be classified as Optional information.

According to an embodiment, SFC/SFP ID represents a SFC and SFP identifier and may optionally include metadata for SFC encapsulation. The SFC/SFP ID and the metadata can be used to classify traffic and apply service functions on a 5G network. The SFC/SFP ID may be classified as Optional information.

The Traffic Description, Target UE Identifier, AF transaction identifier, N6 Traffic Routing requirements, SFC/SFP ID shown in FIG. 7 can be applied to a PCF or an NEF.

FIG. 8 shows an example of traffic steering relevant information in an FAR that is transmitted to a UPF by an SMF in accordance with an embodiment of the disclosure.

The PCF can transmit a PCC rule to the SMF in the same way as the related art, and the SMF can configure an FAR on the basis of the PCC rule received from the PCF. In the disclosure, it is possible to newly and additionally define SFC/SFP ID and optionally metadata in an existing FAR together with forwarding policy information. The SFC/SFP ID and the metadata that are newly added can be used to perform SFC capsulation of a corresponding packet when a UPF formulates a traffic steering policy.

Referring to FIG. 8, according to an embodiment, N4 Session ID can identify an N4 session related to the FAR.

According to an embodiment, Rule ID may be the only one identifier for identifying information.

According to an embodiment, forwarding policy may mean referring to a preconfigured traffic steering policy or HTTP redirection. The Forwarding policy may include one of the following policies that are identified by TSP ID.

(1) an N6-LAN steering policy to steer a subscriber's traffic to appropriate N6 service functions deployed by an operator, (2) a local N6 steering policy to enable traffic steering in local access to a DN according to routing information provided by an AF as described in clause 5.6.7, and (3) values for a redirection destination for forwarding behavior (always, after measurement report (when a transmission action is "redirect")).

Figure 9:
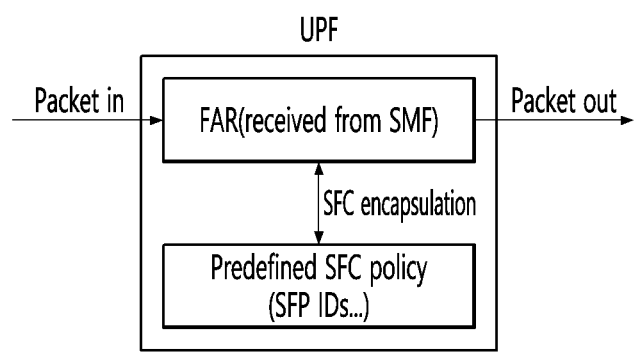
FIG. 9 shows an example of a process in which a UPF performs packet forwarding in accordance with an embodiment of the disclosure.

FIG. 9 shows an example of a process in which a UPF performs packet forwarding in accordance with an embodiment of the disclosure.

Referring to FIG. 9, a UPF can perform packet forwarding in accordance with FAR information when receiving a packet. According to an embodiment, the FAR information may be received from an SMF. The FAR may include L6-LAN traffic steering information and the UPF can perform N6-LAN routing in accordance with the information. When SFC encapsulation is required to perform N6-LAN traffic steering, it is possible to use an SFC/SFP ID and additional metadata in the FAR. Further, for additional information such as a header format or a transport protocol for SFC encapsulation, predetermined SFC policy information in a 5GS can be used. The predefined SFC policy may reflect policy information promised with an AF too. Further, in the case in which one or more SFI ID(s) that can be substantially applied to a packet exist in correspondence to an SFC/SFP ID value defined in the FAR when the UPF performs packet encapsulation, the UPF may select one SFP ID in accordance with the predetermined SFC policy.

According to an embodiment, the predefined SFC policy may have a mapping relationship or a selection method through which it can select one SFP ID. Accordingly, when several SFP ID(s) corresponding to an SFC/SFP ID ID value defined in the FAR exist and the UPF has to select one of the SFP IDs, the UPF can select and use one SPF ID to perform packet encapsulation in accordance with the predefined SFC policy.

Figure 10:
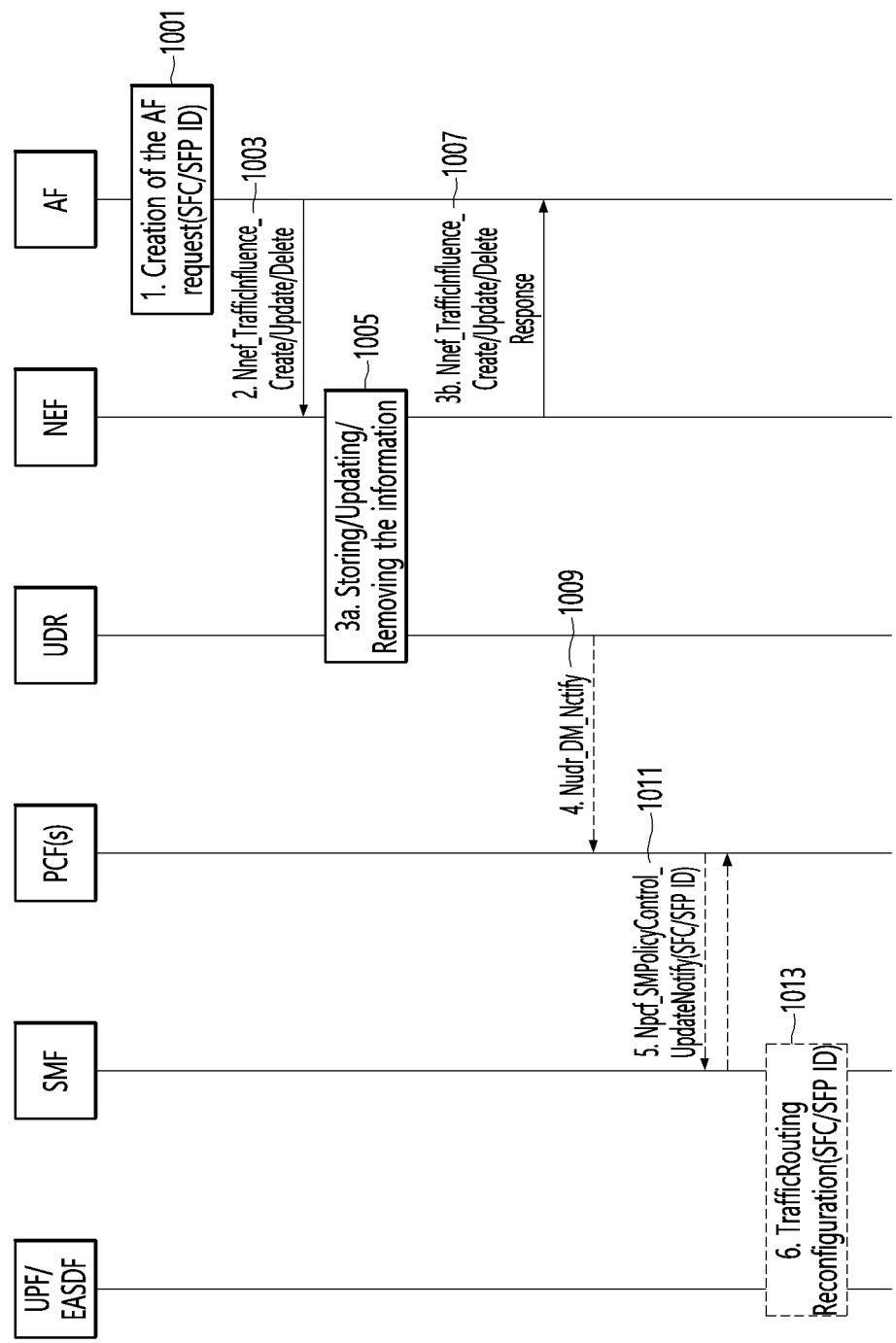
FIG. 10 shows an example of a procedure of managing traffic steering information that is requested by an AF according to an embodiment of the disclosure.

FIG. 10 shows an example of a procedure of managing traffic steering information that is requested by an AF according to an embodiment of the disclosure.

Referring to FIG. 10, description of a UPF, an SMF, a PCF(s), an NEF, and an AF may be the same as the description of the UPF, PCF, SMF, NEF, and AF of FIG. 2.

An Edge Application Service Discovery Function (EASDF) is a function for providing an edge application service on a 5G network. The EASDF collects location information, a service characteristic, etc. of edge applications and provides UE with the information, thereby helping the UE select an appropriate edge application when using a service. The EASDF has various entities in a network and an interface, so it is possible to provide an edge application service using information collected by the EASDF.

A UDR means User Data Repository and may be an element that stores and manages user data on a 5G network. The UDR is a data repository that is used on a 5G network. The UDR stores a user profile, a policy, and other network relevant data and can be used for a service provider to optimize services and improve user's experiences. The UDR can store and manage data for each service in cooperation with a network slicing function too.

Referring to FIG. 10, an AF can additionally request an SFC ID or an SFP ID when requesting AF influenced traffic steering from an NEF (1001). The SFC ID may be a unique identifier that is used to identify an SFC instance and the SFP ID may be an identifier that is used to identify a service function chain that is used on a service path.

The NEF can receive the SFC ID or the SFD ID from the AF using a message "Nnef_TrafficInfluence_Create/Update/Delete" (1003).

The NEF can store, update, and remove information, which is requested by the AF, in the UDR, including an SFC ID or SFP ID value (1005).

The NEF can transmit a message "Nnef_TrafficInfluence_Create/Update/Delete Response" to the AF in response to the message "Nnef_TrafficInfluence_Create/Update/Delete" in the operation 1003 (1007).

The UDR can inform a PCF(s) that information has been updated in the UDR (1009).

The PCF(s) can transmit new policy information, including the SFC ID or the SFP ID, to an SMF (1011).

The SMF can transmit FAR forwarding information, including the SFC ID or the SFP ID, to a UPF/EASDF (1013).

Figure 11:
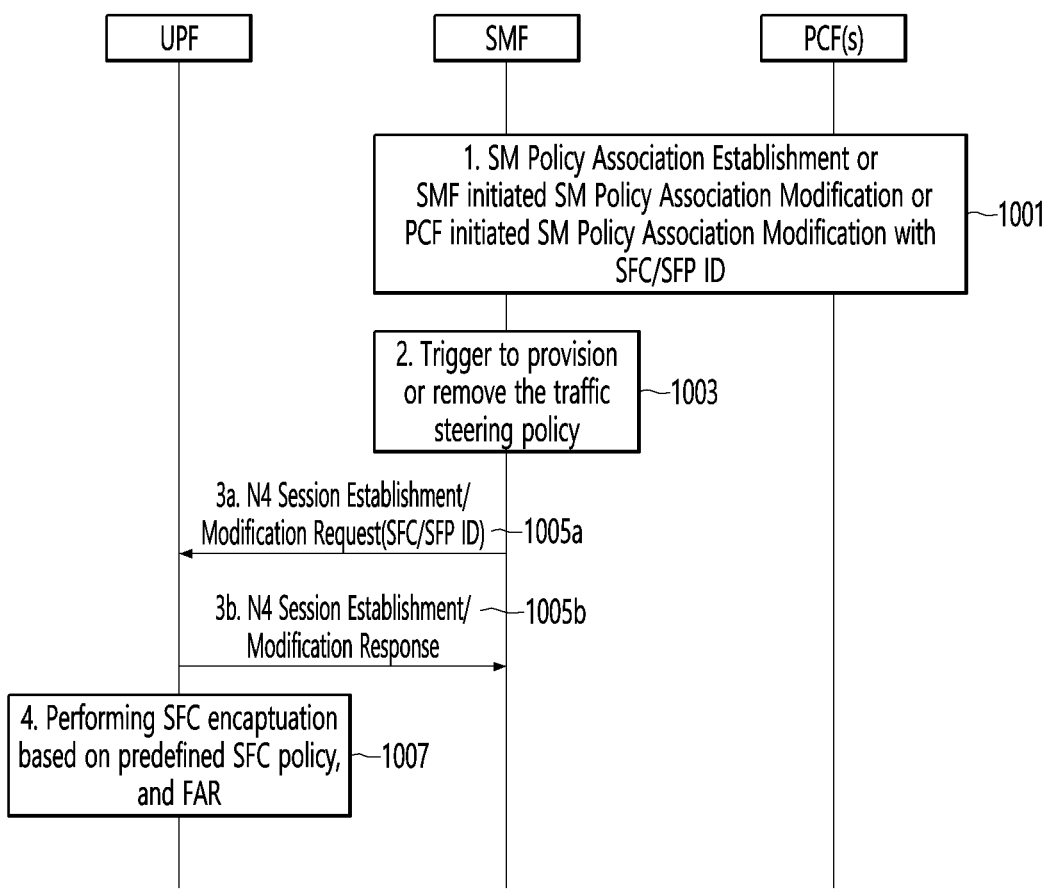
FIG. 11 shows an example of a procedure of managing traffic steering information set in a 5GS according to an embodiment of the disclosure.

FIG. 11 shows an example of a procedure of managing traffic steering information set in a 5GS according to an embodiment of the disclosure.

Referring to FIG. 11, a PCF can configure N6-LAN traffic steering information including an SFC/SFP ID in a PCC rule and can transmit the PCC rule to an SMF (1101).

The SMF can configure a traffic steering policy in accordance with the transmitted PCC rule (1103).

The SMF can transmit an FAR including an SFC ID or an SFP ID to a UPF using a message "N4 Session Establishment Modification Request" (1005*a*).

The UFP can respond to the SMF about the message "N4 Session Establishment Modification Request" using a message "N4 Session Establishment Modification Response" (1105*b*).

According to various embodiments of the disclosure, a method in which a 5G system (5GS) supports an N6-LAN traffic steering function using an SFC technology may include: a step in which a PCF puts additional information for N6-LAN traffic steering into a PCC rule; a step in which an SMF creates an FAR including the additional information for N6-LAN traffic steering; and a step in which a UFP performs SFC encapsulation using a predefined SFC policy and the FAR.

According to an embodiment, the additional information for N6-LAN traffic steering may be an SFC ID or an SFP ID and optionally metadata.

According to an embodiment, the PCF can configure a PCC rule separately when the additional information for N6-LAN traffic steering is received through the NEF from the AF and when the additional information for N6-LAN traffic steering is internally set.

According to an embodiment, the SMF can receive the PCC rule including the additional information for N6-LAN traffic steering from the PCF, configure an FAR including the information, and transmit the FAR to the UPF.

According to an embodiment, in the case in which one or more SFP ID(s) corresponding to the SFC/SFP ID stored in the FAR exist when the UPF performs an SFC encapsulation on a packet, the UPF can select one SFP ID in accordance with a predefined SFC policy and perform packet encapsulation.

Figure 12:
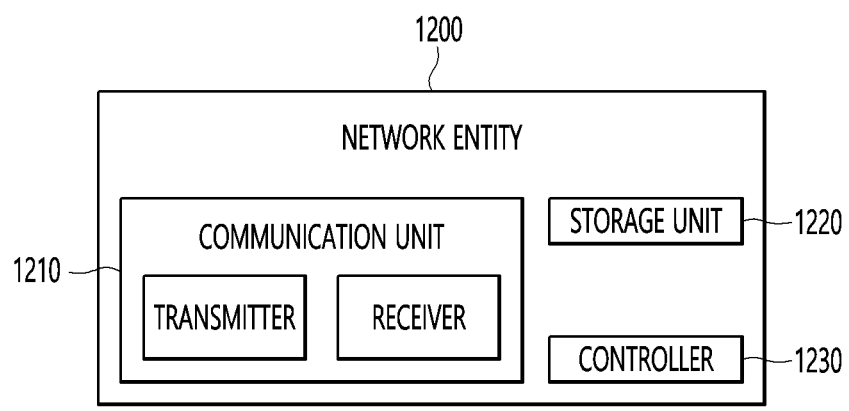
FIG. 12 shows the configuration of a network entity in a wireless communication system according to various embodiments of the disclosure.

FIG. 12 shows the configuration of a network entity in a wireless communication system according to various embodiments of the disclosure.

Referring to 12, a network entity of the disclosure is a concept including a network function, depending on implementation of a system. Terms '~unit', '~er' used hereafter mean the unit for processing at least one function or operation and may be implemented by hardware, software, or a combination of hardware and software. A network entity according to various embodiments of the disclosure may include a communication unit 1210, a storage unit 1220, and a controller 1230 controlling general operations of the network entity 1200. The communication unit 1210 transmits and receives signals to and from other network entities. Accordingly, the communication unit 1210 may be entirely or partially referred to as a "transmitter", a "receiver", or a "transceiver". The storage unit 1220 keeps data such as fundamental programs, applications, setting information, etc. for operation of the network entity 1200. The storage unit 1220 may be a volatile memory, a nonvolatile memory, or a combination of a volatile memory and a nonvolatile memory. The storage unit 1220 provides the kept data in response to a request from the controller 1230. The controller 1230 controls general operations of the network entity 1200. For example, the controller 1230 transmits and receives signals through the communication unit 1210. The controller 1230 records and reads data on and from the storage unit 1220. The controller 1230 can perform the functions of a protocol stack required by communication standards. To this end, the controller 1230 may include a circuit, an application-specific circuit, at least one processor, or a microprocessor, or may be a portion of a processor. A portion of the communication unit 1210 and the controller 1230 may be referred to as a communication processor (CP). The controller 1230 can control the network entity 1200 to perform the operation of any one of various embodiments of the disclosure. It should be noted that the communication unit 1210 and the controller 1230 are not necessarily implemented as separate modules and may be implemented as one component, for example, in a single chip or software block type. The communication unit 1210, the storage unit 1220, and the controller 1230 may be electrically connected to each other. The operations of the network entity 1200 can be implemented by having the storage unit 1220, which keeps corresponding program codes, in the network entity 1200. The network entity 1220 includes network nodes and may be any one of an AMF, an SMF, a UPF, an NF, an NEF, an NRF, an EASDF, a UDM, an AF, an AUSF, an SCP, a UDSF, and the network functions shown in FIGS. 1 and 2.

Figure 13:
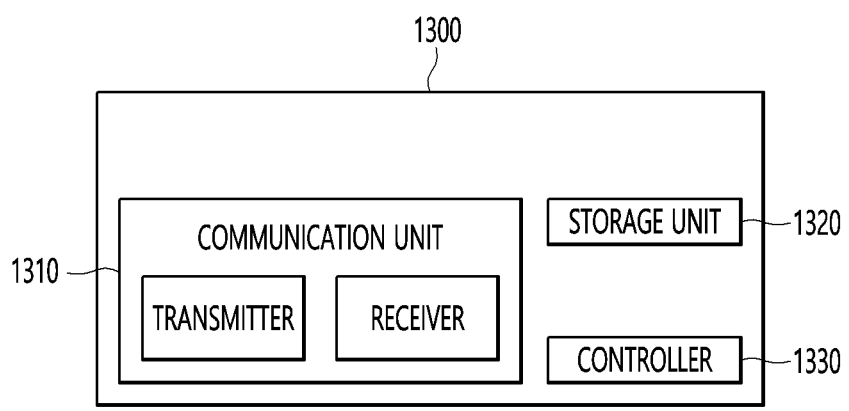
FIG. 13 shows the configuration of an apparatus for supporting an N6-LAN traffic steering function using an SFC technology in a wireless communication system according to various embodiments of the disclosure.

FIG. 13 shows the configuration of an apparatus for supporting an N6-LAN traffic steering function using an SFC technology in a wireless communication system according to various embodiments of the disclosure.

Referring to FIG. 13, terms '~unit', '~er' used hereafter mean the unit for processing at least one function or operation and may be implemented by hardware, software, or a combination of hardware and software. An apparatus 1300 for supporting an N6-LAN traffic steering function using an SFC technology according to various embodiments of the disclosure may include a communication unit 1310, a storage unit 1320, and a controller 1330 controlling general operations of the apparatus 1300. The communication unit 1310 transmits and receives signals to and from other network entities. Accordingly, the communication unit 1310 may be entirely or partially referred to as a "transmitter", a "receiver", or a "transceiver". The storage unit 1320 keeps data such as fundamental programs, applications, setting information, etc. for operation of the network entity 1300. The storage unit 1320 may be a volatile memory, a nonvolatile memory, or a combination of a volatile memory and a nonvolatile memory. The storage unit 1320 provides the kept data in response to a request from the controller 1330. The controller 1330 controls general operations of the apparatus 1300. For example, the controller 1330 transmits and receives signals through the communication unit 1310. The controller 1330 records and reads data on and from the storage unit 1320. The controller 1330 can perform the functions of a protocol stack required by communication standards. To this end, the controller 1330 may include a circuit, an application-specific circuit, at least one processor, or a microprocessor, or may be a portion of a processor. A portion of the communication unit 1310 and the controller 1330 may be referred to as a communication processor (CP). The controller 1330 can control the apparatus 1300 to perform the operation of any one of various embodiments of the disclosure. It should be noted that the communication unit 1310 and the controller 1330 are not necessarily implemented as separate modules and may be implemented as one component, for example, in a single chip or software block type. The communication unit 1310, the storage unit 1320, and the controller 1330 may be electrically connected to each other. The operations of the apparatus 1300 can be implemented by having the storage unit 1320, which keeps corresponding program codes, in the apparatus 1300.

Methods according to the claims or the embodiments described in the specification may be implemented in hardware, software, or a combination of software and hardware.

When they are implemented in software, a computer-readable storage medium that stores one or more programs (software modules) may be provided. The one or more programs stored in the computer-readable storage medium are configured to be able to be executed by one or more processors in an electronic device. The one or more programs include instructions for the electronic device to perform the methods according to the claims of the disclosure or embodiments described in the specification.

Such programs (software modules, software) may be stored in a nonvolatile memory including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or another type of optical storage device, and a magnetic cassette. Alternatively, they may be stored in a memory configured by combining some or all of the devices. Each configuration memory may be included as several pieces.

The programs may be stored in an attachable storage device that can be accessed through a communication network such as the internet, an intranet, a Local Area Network (LAN), a Wide Area Network (WAN), or a Storage Area Network (SAN), or a network configured by combining them. The storage device can access a device that performs embodiments of the disclosure through an external port. A separate storage device in a communication network can access a device that performs the embodiments of the disclosure.

In the detailed embodiment of the disclosure described above, the components included in the disclosure were described in singular forms or plural forms, depending on the proposed detailed embodiments. However, the singular or plural expressions were appropriately selected in the proposed situations for the convenience of description and the disclosure is not limited to the singular or plural components. Further, even if components are described in a plural form, they may be singular components, or even if components are described in a singular form, they may be plural components.

Although detailed embodiments were described above, various modifications are possible without departing from the scope of the disclosure. Accordingly, the range of the disclosure is not limited to the embodiments and should be defined by not only the range of the claims described below, but also equivalents to the range of the claims.

What is claimed is:

1. A method of supporting an N6-LAN traffic steering function using a service function chaining (SFC) technology in a wireless communication system, the method comprising:

configuring, by a policy control function (PCF), additional information for N6-LAN traffic steering on the basis of a policy and charging control (PCC) rule, wherein the additional information includes at least one of a service function chaining (SFC) ID or a service function path (SFP) ID, and metadata for SFC encapsulation;

transmitting the configured additional information to a session management function (SMF);

configuring, by the SMF, a forwarding action rule (FAR) including the additional information for N6-LAN traffic steering;

transmitting, by the SMF, the FAR including the additional information to a user plane function (UPF); and performing, by the UPF, SFC encapsulation on the basis of a predefined SFC policy and the FAR, wherein the SFC encapsulation comprises adding an SFC header to a packet, the SFC header including a service path identifier (SPI) and a service index (SI), wherein the SPI is set to the SFP ID uniquely identifying a specific service function path within an SFC-enabled domain and the SI is set to a value representing a total length of the SFP, the total length indicating a number of service functions or hops in the SFP.

2. The method of claim 1, wherein the SFC ID and the SFP ID identify specific service functions and service paths in the N6-LAN.

3. The method of claim 1, wherein the metadata includes context information for the SFC encapsulation.

4. The method of claim 1, further comprising:
configuring, by the PCF, a first policy and charging control (PCC) rule when the additional information for N6-LAN traffic steering is received through an NEF from an AF, wherein the first PCC rule is adapted for AF-influenced traffic steering based on SFC capabilities provided by the AF; and
configuring, by the PCF, a second PCC rule when the additional information for N6-LAN traffic steering is internally set,
wherein the first PCC rule and the second PCC rule are different from each other in terms of at least one of referenced traffic steering policy identifiers or specific N6 traffic routing information, to accommodate distinct traffic steering requirements.

5. The method of claim 1, further comprising:
selecting, by the UPF, one identifier in accordance with the predefined SFC policy in a case in which one or more identifiers corresponding to an SFC ID or an SFP ID stored in the forwarding action rule (FAR) exist when the UPF performs SFC encapsulation on a packet; and
performing packet encapsulation on the basis of the one identifier.

6. An apparatus for supporting an N6-LAN traffic steering function using a service function chaining (SFC) technology in a wireless communication system, the apparatus comprising:
a policy control function (PCF), a session management function (SMF), and a user plane function (UPF),
wherein the PCF is configured to:
configure additional information for N6-LAN traffic steering on the basis of a policy and charging control (PCC) rule; and
transmit the configured additional information to the session management function (SMF), wherein the additional information includes at least one of an SFC ID or a service function path (SFP) ID, and metadata for SFC encapsulation,
wherein the SMF is configured to:
configure a forwarding action rule (FAR) including the additional information for N6-LAN traffic steering; and
transmit the FAR including the additional information to the user plane function (UPF),
wherein the UPF is configured to:
perform SFC encapsulation on the basis of a predefined SFC policy and the FAR, wherein the SFC encapsulation comprises adding an SFC header to a packet, the SFC header including a service path identifier (SPI) and a service index (SI), wherein the SPI is set to the SFP ID uniquely identifying a specific service function path within an SFC-enabled domain and the SI is set to a value representing a total length of the SFP, the total length indicating a number of service functions or hops in the SFP.

7. The apparatus of claim 6, wherein the SFC ID and the SFP ID identify specific service functions and service paths in the N6-LAN.

8. The apparatus of claim 6, wherein the metadata includes context information for the SFC encapsulation.

9. The apparatus of claim 6, wherein the PCF is configured to:
configure a first policy and charging control (PCC) rule when the additional information for N6-LAN traffic steering is received through an NEF from an AF, wherein the first PCC rule is adapted for AF-influenced traffic steering based on SFC capabilities provided by the AF, and
configure a second PCC rule when the additional information for N6-LAN traffic steering is internally set,
wherein the first PCC rule and the second PCC rule are different from each other in terms of at least one of referenced traffic steering policy identifiers or specific N6 traffic routing information, to accommodate distinct traffic steering requirements.

10. The apparatus of claim 6, wherein the UPF is configured to:
select one identifier in accordance with the predefined SFC policy in a case in which one or more identifiers corresponding to an SFC ID or an SFP ID stored in the forwarding action rule (FAR) exist when the UPF performs SFC encapsulation on a packet, and
perform packet encapsulation on the basis of the one identifier.

11. A method of operating a user plane function (UPF) in a wireless communication system, the method comprising:
receiving additional information for N6-LAN traffic steering from a policy control function (PCF) through a session management function (SMF) on the basis of a policy and charging control (PCC) rule, wherein the additional information includes at least one of a service function chaining (SFC) ID or a service function path (SFP) ID, and metadata for SFC encapsulation; and
performing SFC encapsulation on the basis of a predefined service function chaining (SFC) policy and a forwarding action rule (FAR),
wherein the SFC encapsulation comprises adding an SFC header to a packet, the SFC header including a service path identifier (SPI) and a service index (SI), wherein the SPI is set to the SFP ID uniquely identifying a specific service function path within an SFC-enabled domain and the SI is set to a value representing a total length of the SFP, the total length indicating a number of service functions or hops in the SFP.

12. The method of claim 11, wherein the SFC ID and the SFP ID identify specific service functions and service paths in the N6-LAN.

13. The method of claim 11, wherein the metadata includes context information for the SFC encapsulation.

14. The method of claim 11, further comprising:
selecting, by the UPF, one identifier in accordance with a predefined SFC policy in a case in which one or more identifiers corresponding to an SFC ID or an SFP ID stored in the forwarding action rule (FAR) exist when the UPF performs SFC encapsulation on a packet; and
performing packet encapsulation on the basis of the one identifier.

15. The method of claim 11, wherein the UPF transmits a packet on the basis of the forwarding action rule (FAR).

* * * * *